United States Patent Office 3,451,946
Patented June 24, 1969

3,451,946
IMPROVED COBALT MOLYBDATE CATALYST FOR OXIDIZING OLEFINS
Charles E. Ziegler, Therwil, Basel-Land, Switzerland, and Jamal S. Eden, Akron, Ohio, assignors to The B. F. Goodrich Company, New York, N.Y., a corporation of New York
No Drawing. Original application Jan. 27, 1964, Ser. No. 340,506. Divided and this application July 8, 1966, Ser. No. 571,674
Int. Cl. B01j *11/32, 11/82*
U.S. Cl. 252—439    6 Claims

ABSTRACT OF THE DISCLOSURE

An improved catalyst containing a major proportion of cobalt molybdate, tellurium oxide and rhenium oxide or perrhenic acid is useful in oxidizing propylene at high conversions to produce acrylic acid and acrolein in improved yields.

---

This is a division of application Ser. No. 340,506 filed Jan. 27, 1964, and now abandoned.

This invention relates to a method for producing a mixture of acrolein and acrylic acid by the vapor phase oxidation of propylene and to a catalyst containing $CoMoO_4$, $TeO_2$ and a rhenium compound for effecting the conversion of propylene to the said products.

Vapor phase oxidation of propylene to acrolein is well known in the art, but the known processes have at least one of the following shortcomings, either conversion of propylene to useful products per pass is quite low, which necessitates a separation and recycling step, or the product of oxidation is almost exclusively acrolein which has some industrial utility, but not in the volume attained by acrylic acid. Acrylic acids can be produced from acrolein, but yields are not good or the reaction time is exceedingly long. These additional steps for producing acrylic acid from acrolein make the process for acrylic acid production economically unattractive.

With the catalyst of this invention it is possible to convert from about 68 to 100% of the propylene per pass and obtain yields of about 50 to 88% of desired products. The ratio of acrylic acid to acrolein (i.e. the mol percent yield of acrylic acid, based on propylene converted) can vary considerably and can be as high as about 13 to 1 or as low as about 1 to 2, depending in part on catalyst composition and in part on reaction conditions. This flexibility is desirable, as it provides a means for limiting the production of one of the undesired end products.

The temperature at which the conversion of propylene to acrolein and acrylic acid takes place with the catalyst of this invention can vary between about 300 and 425° C. Above 425° C., there is an excessive decomposition of the partially oxidized olefinic products to $CO_2$ and $CO$. The most desirable operating range, however, is from about 350 to 400° C.

The reaction can be carried out with either a fixed bed or fluid bed catalyst system. The catalyst can be supported or unsupported. Certain supports, such as silica gel or pumice appear to act as catalyst diluents which tend to lower conversion of propylene and form lower yields of acrylic acid. This dilution effect is not as pronounced with diatomaceous earth supports. It is preferred to use an unsupported catalyst.

The molar ratio of components in the catalyst can vary as follows:

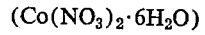
$CoMoO_4$ ---------------------------------- 800
$TeO_2$ ---------------------------------- 15–300
$HReO_4$ ---------------------------------- 1–10

With large amounts of $TeO_2$ there is a tendency to favor production of acrolein and a reduction in the amount of acrylic acid.

PREPARATION OF CATALYST

One mol (291 g.) of cobaltous nitrate $$(Co(NO_3)_2 \cdot 6H_2O)$$

was dissolved in 300 g. of water. A solution of 1 molar equivalent of ammonium molybdate (177 g.

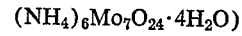
$$(NH_4)_6Mo_7O_{24} \cdot 4H_2O)$$

was prepared by heating and stirring in 200 ml. of water, and thereafter cooled.

The cobaltous nitrate solution was added, with constant stirring, to the ammonium molybdate solution. A solution of 80 g. concentrated $NH_4OH$ in 80 g. of water was added dropwise to the cobaltous nitrate-ammonium molybdate mixture. Stirring was continued for 30 minutes after addition of the $NH_4OH$. The slurry was filtered and washed with 1500 ml. water. The solids were resuspended in water two additional times and filtered. The solids were washed with 1500 ml. water each time they were filtered. To the cobalt molybdate are added various quantities of $TeO_2$ and $HReO_4$ as fine powders and dispersed as evenly as possible by stirring. The amount of $TeO_2$ and $HReO_4$ will vary depending on the ratio of

$$CoMoO_4 \cdot TeO_2 \cdot HReO_4$$

or $R_2O_7$ desired in the completed catalyst. For preparing a molar ratio of 800 $CoMoO_4$, 30 $TeO_2$ and 1 $HReO_4$ the amount of $TeO_2$ needed is 3.2 g. and the amount of perrhenic acid is .250 g. or its equivalent as the ammonium salt. At this stage the catalyst is in the form of a paste. This is dried in a vacuum oven at 80° C. and then baked in an oven at 400° C. for 16 hours. The catalyst is then ground to the desired size. For fixed bed systems a 10–18 U.S. sieve size is satisfactory. For fluid bed systems operating at atmospheric pressure or slightly above, particles passing an 80 mesh U.S. sieve size screen but not a 325 mesh are most desirable.

For preparing a supported catalyst the most desirable procedure is to prepare a solution of the cobaltous salt in water, dissolve ammonium molybdate in water and dissolve ammonium tellurite in $HNO_3$ solution while maintaining the pH of the latter at 4–6, and a solution of $HReO_4$ is prepared in water. The cobaltous salt is added to the molybdate solution. Then the tellurite solution is added, and the solution of perrhenic acid. Finally silica gel or diatomaceous earth or other carrier of the particle size desired is added to the slurry, the slurry is evacuated, stirred well to distribute the carrier uniformly and thereafter filtered, washed and baked at 400° C. for about 16 hours.

Any soluble or insoluble tellurite which can be converted to $TeO_2$ during the catalyst preparation can be used. Similarly any rhenium compound convertible to $Re_2O_7$ can be employed.

The preferred catalysts are those in which the molar ratio of cobalt molybdate is about 800, the tellurium oxide is 20–30 and the perrhenic acid is 1–2.

THE REACTANTS

The reactants are propylene, either pure or contaminated with propane or other readily volatile hydrocarbons, and oxygen, or an oxygen containing gas, such as air, or a mixture of nitrogen and oxygen containing more than 21% oxygen. For economic reasons air is preferred as the oxidizing reactant.

Hydrocarbons such as ethane, ethylene, propane, butane and the like are not oxidized to any great extent and therefore can be used as diluents. However, they do use up some oxygen and therefore the quantity of the latter must be adjusted to provide best results.

Because some of the propylene is oxidized to CO and $CO_2$ it is most desirable to use a stoichiometric excess of 30–100% oxygen in the reaction. The preferred excess is about 66 mol percent excess oxygen. The maximum amount of oxygen is not determinable, but the mixture of olefin and oxygen should be such that it is not explosive under the reaction conditions.

Water vapor is a desirable adjunct in the reaction for the reason that higher yields of desired products, acrolein and acrylic acid, are obtained if it is present, but it is not essential to the obtainment of good yields of products by this procedure.

The ratio of water vapor to propylene can range from 0 to 7.

The examples which follow are intended to explain the invention but not to limit it.

Example I

A series of runs was made in a fixed bed reactor, which consisted of a high silica glass tube 28 cm. long and 22 mm. O.D. containing three inlets, one for air, one for propylene and one for steam. The reactor had three sets of external electrically operated heating coils, one of which could heat the entire outer surface of the reactor and each of the other coils would heat only about one half the length of the reactor. The outlet vapors were passed through a Perkin-Elmer gas chromatograph Model 154D for continuous analysis of exit gases.

The catalyst (60 ml.), made in a mol ratio of 800 $CoMoO_4$, 20 $TeO_2$ and 1 $HReO_4$, filled about 90% of the volume of the reactor.

Gases were preheated to about 250° C. before entering the reactor.

The ratio of air to propylene was adjusted to provide about 66% excess over the stoichiometric amount needed for converting propylene to acrylic acid.

Steam, in a ratio of 1 to 4 mols per mol of propylene, was added to the reactor.

Contact time in all fixed bed tests was cold contact time. A 20 second cold contact time is equivalent to about 8 seconds hot contact time.

Data obtained in these runs are tabulated below:

lyst have a profound effect on conversion and on the temperature at which conversion is effected. The best data known for this type of reaction are reported in Belgian Patent 587,683 where a catalyst containing $CoMoO_4$ and $TeO_2$ but no rhenium shows a conversion of 42% propylene and yields of acrolein of 12% and acrylic acid of 58% on the propylene converted at 450° C. The efficiency for acrolein production is about 5% and for acrylic acid, about 24% for a total efficiency of 29%, as compared to a minimum efficiency of about 59.9% as calculated from the data in the above table. In Belgian Patent 623,-214, where a $CoMoO_4$ catalyst containing $TeO_2$ is used and the oxidation is effected at 0.55 atmosphere, a propylene conversion of 81% with a 36% yield of acrylic acid and 14% acrolein is reported. The combined efficiency is 40.5% at a temperature of 433° C.

Example II

In order to determine the effect of water vapor the following series of runs were made at 350° C. with the catalyst described in Example 1. In all instances the amount of excess oxygen was 66%, based on the propylene fed.

TABLE II

| Water Propylene ratio | Contact Time, Sec. | Mol percent Conversion Propylene | Mol percent Yield | | Mol percent Efficiency | |
|---|---|---|---|---|---|---|
| | | | Acr. | AA | Acr. | AA |
| 4 | 28 | 96.1 | 10.2 | 58.4 | 9.8 | 56.1 |
| 1 | 35 | 99.6 | 9.5 | 57.8 | 9.5 | 57.5 |
| 0 | 37 | 97.9 | 22.3 | 45.6 | 10.2 | 44.6 |
| 0 | 25 | 82.7 | 32.5 | 39.3 | 26.8 | 32.4 |

These data show that water is beneficial, but not essential, for obtaining good yields of acrolein and acrylic acid with the catalyst. The yields of acrylic acid are somewhat lower and those of acrolein somewhat higher in the absence of water, but if excess water presents a problem in the separation and purification steps, the amount of water can be controlled to some degree by operating in this manner.

Example III

This series of runs was made with a catalyst having a mol ratio of 800 $CoMoO_4$, 15 of $TeO_2$ and 1 of $HReO_4$. The data are tabulated below.

TABLE III

| Percent excess $O_2$ | Steam/Propylene Ratio | Contact Time, Sec. | T., °C. | Percent Conversion Propylene | Mol Percent Yield | | Mol Percent Efficiency | |
|---|---|---|---|---|---|---|---|---|
| | | | | | Acr. | AA | Acr. | AA |
| 66 | 4 | 28 | 330 | 79.5 | 21.2 | 44.0 | 16.9 | 35.0 |
| 66 | 4 | 28 | 350 | 95.3 | 8.3 | 43.2 | 8.0 | 41.0 |
| 33 | 4 | 20 | 390 | 83.5 | 10.8 | 52.0 | 9.0 | 43.5 |

TABLE I

| Percent excess $O_2$ | Steam/propylene ratio | Contact Time, Sec. | T., °C. | Percent Conversion Propylene | Mol Percent Yield on propylene converted | | Mol Percent Efficiency | |
|---|---|---|---|---|---|---|---|---|
| | | | | | Acr. | AA | Acr. | AA |
| 66 | 4 | 20 | 320 | 67.9 | 55.7 | 32.6 | 37.8 | 22.1 |
| 66 | 4 | 20 | 350 | 94.1 | 25.9 | 56.7 | 24.4 | 53.3 |
| 66 | 4 | 28 | 350 | 99.0 | 11.0 | 62.7 | 11.0 | 62.1 |
| 66 | 4 | 38 | 350 | 100 | 5.9 | 60.5 | 5.9 | 60.5 |
| 66 | 1 | 35 | 350 | 100 | 4.3 | 55.7 | 4.3 | 55.7 |

NOTE.—Acr.=acrolein; AA=acrylic acid.

These data show that good conversions of propylene are obtainable per pass at temperatures of 320° C., that the ratio of acrolein to acrylic acid can be controlled by controlling either contact time or temperature or both and that at a temperature of 350° C. about 50% or more of desirable products can be obtained on extremely high conversions of propylene. They also point out that extremely small amounts of rhenium compound in the cata- For comparative purposes a catalyst similar to that of this example, but containing only 0.5 mol of $HReO_4$, was run under conditions of 66% excess oxygen, 4 mols steam per mol of propylene and a 20 second contact time and the yields of acrylic acid were quite low. At 335° C. conversion of propylene was 55%, the yield of acrolein was 20.5% and that of acrylic acid was 19.6%. At 355° C. conversion was 80.6%, yield of acrolein was 14.6% and that of acrylic acid was 25.7%; at 385° C. the conversion was 89.1%, the yield of acrolein was 4.5% and that of acrylic acid 20.1%. This shows that the effect of rhenium compounds in the ratio 0.5 mol is too low to be practical.

Example IV

The catalyst in these tests was made by the procedure described above using a ratio of 800:30:1 of molybdate, to tellurium, to rhenium, respectively. The contact time in each instance was 20 seconds. Reaction temperature and oxygen-propylene ratios were varied. The data obtained in these runs are tabulated below.

TABLE IV

| Temp., °C. | Percent excess $O_2$ | $H_2O$ propylene ratio | Mol Percent conversion propylene | Yield, Mol Percent | | Mol Percent Efficiency | |
|---|---|---|---|---|---|---|---|
| | | | | Acr. | AA | Acr. | AA |
| 380 | 33 | 4 | 85.4 | 32.5 | 29.0 | 27.7 | 24.8 |
| 400 | 66 | 4 | 100.0 | 15.9 | 49.5 | 15.9 | 49.5 |
| 400 | 66 | 4 | 96.4 | 19.9 | 40.2 | 19.2 | 38.7 |
| 400 | 66 | 4 | 99.8 | 6.0 | 51.2 | 6.0 | 51.2 |
| 410 | 100 | 4 | 100 | 1.7 | 39.6 | 1.7 | 39.6 |
| 340 | 0 | 4 | 67.8 | 49.0 | 32.0 | 33.2 | 21.7 |

With this catalyst the ratio of end products obtained can be varied considerably by adjusting the temperature or the amount of excess oxygen.

Example V

The catalyst for these tests contained the following molar ratios of ingredients: cobalt molybdate 800, tellurium oxide 300, $HReO_4$ 10. In each case the runs were made with 66% excess oxygen, a ratio of 4 mols of water per mol of propylene and a 20 second contact time. The results of the tests are tabulated below:

TABLE V

| Temp., °C. | Mol percent Conversion Propylene | Mol percent yield on Propylene Converted | | Mol percent Efficiency | |
|---|---|---|---|---|---|
| | | Acr. | AA | Acr. | AA |
| 385 | 85.2 | 74.8 | 19.3 | 63.7 | 16.4 |
| 405 | 95.2 | 57.8 | 31.1 | 55.0 | 29.6 |
| 420 | 95.4 | 51.2 | 27.6 | 48.8 | 26.3 |
| 445 | 100 | 26.5 | 16.1 | 26.5 | 16.1 |

This data show that with this catalyst temperatures as high as 445° C. result in decrease in acrolein and acrylic acid yields and efficiency. Analyses showed that there was a considerable increase in carbon oxides when the temperature was raised from 420 to 445° C. A further observation is that with the large amounts of $TeO_2$ the ratio of acrolein to acrylic acid is considerably higher than when the $TeO_2$ content is present in a ratio of 20:30 mols per 800 mols of $CoMoO_4$.

Example VI

A supported catalyst was prepared as follows: 349.5 g. of cobaltous nitrate were dissolved in 2 liters of concentrated $NH_4OH$, 212.9 g. of ammonium molybdate was added to the cobaltous nitrate. 8.6 g. of telluric acid and 0.377 g. of $HReO_4$ were separately dissolved in water and added to the cobaltous nitrate-ammonium molybdate mixture.

Microsperoidal silica (144.0 g.) having a surface area of about 350 m. per gram was added to 600 ml. concentrated ammonium hydroxide and the mixture was heated at 65° C. for three hours. The silica was filtered and allowed to air dry.

The silica was placed in a suction flask and part of the solution containing the remaining ingredients was added. The flask was evacuated to fill the interstices of the silica with catalyst. The procedure was repeated after addition of the remainder of the cobalt nitrate-ammonium molybdate, telluric acid and perrhenic acid mixture.

The entire mixture was then placed in a beaker and dried on water bath. Additional drying at 90° C. in a forced draft oven for four hours was given to the catalyst. It was then baked for 48 hours at 400° C., crushed and sieved. This catalyst had a ratio of 800 mols $CoMoO_4$, 30 mols TeO, one mol $HReO_4$ and 400 mols $SiO_2$.

To the reactor were added 40 g. of the catalyst of 10–18 mesh size.

In each instance an oxygen excess of 66%, 4 mols of water vapor per mol of propylene were used. The cold contact time was 13 seconds.

The results of these tests are tabulated below:

TABLE VI

| Temp.,°C. | Mol Percent Conversion Propylene | Mol Percent Yield | | Mol Percent Efficiency | |
|---|---|---|---|---|---|
| | | Acr. | AA | Acr. | AA |
| 355 | 84.3 | 25.0 | 57.0 | 21.0 | 48.0 |
| 380 | 94.3 | 16.0 | 55.5 | 15.0 | 52.3 |
| 400 | 97.8 | 14.8 | 41.1 | 14.5 | 40.2 |

If colloidal silica in aqueous suspension is used as a support, the preferred way of making the catalyst is to precipitate the ingredients on the silica particles.

Examples VII

In these runs the catalyst was composed of a mol ratio of 800 for the cobalt molybdate, 30 for $TeO_2$ and 10 for $HReO_4$. The catalyst was made by the procedure described above and was also used in a mesh size of 10–18. In all these runs 66% excess oxygen, and 4 mols of water per mol of propylene were fed into the reactor. The data of these tests are tabulated below.

TABLE VII

| Contact Time, Sec. | Temp., °C. | Mol Percent Conversion Propylene | Mol Percent Yield | | Mol Percent Efficiency | |
|---|---|---|---|---|---|---|
| | | | Acr. | AA | Acr. | AA |
| 20 | 370 | 92.8 | 56.3 | 31.4 | 52.2 | 29.1 |
| 20 | 400 | 100 | 26.2 | 38.5 | 26.2 | 28.5 |
| 38 | 350 | 94 | 53.8 | 31.8 | 50.6 | 29.9 |

Example VIII

The following data show results obtained with a catalyst of 800 mols cobalt molybdate, 60 mols $TeO_2$ and 2 mols $HReO_4$. The feed contained 66% excess oxygen, 4 mols of steam per mol of propylene and the contact time was 20 seconds.

TABLE VIII

| Temp.,°C. | Mol Percent Conversion Propylene | Mol Percent Yield | | Mol Percent Efficiency | |
|---|---|---|---|---|---|
| | | Acr. | AA | Acr. | AA |
| 655 | 57.6 | 88.0 | 9.5 | 50.7 | 5.5 |
| 375 | 77.0 | 72.0 | 23.4 | 55.4 | 18.0 |
| 400 | 87.0 | 51.0 | 32.2 | 44.4 | 21.8 |

In all the above examples air was used as a source of oxygen. However, comparable results are readily obtained by substituting commercially pure oxygen or oxygen enriched air. Also, the examples above were run in a fixed bed process.

For fluid bed operations it is necessary to use a catalyst having a range of particle sizes different from the 10–18 mesh used in the fixed bed system. Thus, the catalyst was ground more finely and the portion which passed through an 80 mesh U.S. sieve but not through a 325 mesh was used. This range of particles sizes was found to be satisfactory because it could be fluidized fairly uniformly through the bed and did not apepar to striate or form channels. It is also desirable in fluid bed systems to have a catalyst with as low a density as possible, so that it can be fluidized quite readily and remain so during the entire course of the reaction. For this reason it is preferable to use catalyst supports where possible, so as to present a large catalytic surface area. When silica is used as a support it is preferable to fill as completely as possible the void in the silica particles, because free silica surfaces are inactive and may even be slight inhibitors of the catalyst. If the silica is porous the cobalt molybdate can be precipitated in an aqueous slurry of the silica or a blend of colloidal silica, such as Ludox, and a microspheroidal silica can be slurried and this then added to a paste of the $CoMoO_4$, $TeO_2$, $HReO_4$, uniformly dispersed therein, dried, baked, crushed and sized prior to use.

For making fluid bed runs, catalyst to a depth of 6–12 inches was added to a high silica (Vycor) glass reactor about 5 feet long having an O.D. of 38 mm. The bottom of the reactor had a sintered glass plate to aid in distributing the gases as they entered the reactor and to retain the catalyst. Water was vaporized and mixed with air, then passed through a heating unit to raise the temperature to about 200–250° C. The air-steam mixture was blended with propylene just prior to entry of the gases into the reactor. Volumes of gaseous ingredients were controlled by the uses of rotameters. The reactor was heated electrically to the desired temperature and maintained at such temperature through the use of rheostats.

Example IX

In this series, 133 g. of a catalyst of 800 mol $CoMoO_4$, 30 $TeO_2$ and 1 $HReO_4$ were added to the reactor. The catalyst occupied a depth of about 7 inches. Air was preheated to slightly below reaction temperature and fed into the reactor at a pressure just sufficient to obtain good fluidization of the catalyst. The reactor section was also heated electrically to a temperature slightly below that desired for reaction. The water was passed through a vaporizer and blended with the air and the blend was run through the heating unit to raise the temperature of the mixture to the desired temperature. Propylene was admitted into the heated air-stream and the entire mixture was passed into the bottom of the reactor. The volume of air, steam and propylene is controlled through measuring devices, so that ratios of reactants and diluents can be adjusted to the desired levels. Temperature measurements are made in the reactor sections by use of thermostats. The effluent from the reactor is run through a water-cooled condenser and then the vapors from the condenser are passed through two Dry Ice traps to condense all the vapors of the organic chemicals formed in the reaction. The gases which are not condensed are passed through a gas meter to measure their volume and then through a vapor phase chromatograph to determine their compositions.

Data from these runs are recorded below.

TABLE IX

| $O_2/C_3H_6$ | $H_2O/C_3H_6$ | C.T., Sec. | T., ° C. | Mol Percent $C_3H_6$ Converted | Mol Percent Yield on Converted $C_3H_6$ | | Mol Percent Efficiency | |
|---|---|---|---|---|---|---|---|---|
| | | | | | Acr. | AA | Acr. | AA |
| 2.4 | 4.80 | 8.4 | 350 | 97.6 | 16.2 | 53.1 | 15.8 | 51.8 |
| 2.71 | 4.58 | 8.4 | 300 | 56.7 | 47.9 | 41.5 | 27.2 | 23.5 |
| 2.44 | 5.44 | 7.3 | 350 | 96.4 | 8.5 | 56.6 | 8.3 | 54.3 |
| 2.65 | 4.66 | 8.2 | 350 | 89.5 | 14.4 | 52.8 | 12.9 | 47.8 |

NOTE.—C.T.=hot contact time.

The condensed liquids are also analyzed for their composition.

The contact time in all of the fluidized catalyst tests is hot contact time, as contrasted with cold contact time reported for all the fixed bed tests.

Example X

This series of runs was made with a catalyst supported on a colloidal silica containing a small amount of sodium (Ludox LS). The composition of the catalyst was 800 mols $CoMoO_4$, 30 mols $TeO_2$, 1 mol $HReO_4$ and 800 mols silica.

The amount of catalyst was 260 g. which provided a 12 inch settled height in the reactor.

The data are tabulated below.

TABLE X

| $O_2/C_3H_6$ | $H_2O/C_3H_6$ | C.T., Sec. | T., ° C. | Mol Percent $C_3H_6$ Converted | Mol Percent Yield on Converted $C_3H_6$ | | Mol Percent Efficiency | |
|---|---|---|---|---|---|---|---|---|
| | | | | | Acr. | AA | Acr. | AA |
| 2.57 | 4.17 | 9.0 | 350 | 67.7 | 41.4 | 37.5 | 28.0 | 25.4 |
| 2.77 | 4.32 | 9.1 | 375 | 78.3 | 29.1 | 37.5 | 22.8 | 29.4 |

Example XI

The runs of this example were made with a supported catalyst having a composition equivalent to 800 mols $CoMoO_4$, 30 mols $TeO_2$, one mol $HReO_4$ and a total of 800 mols of silica.

The silica support was prepared by adding 690 mols of microspheroidal silica gel to an aqueous suspension of colloidal silica Ludox LS, containing enough silica to provide 160 mols $SiO_2$. The mixture of the two silica ingredients was stirred thoroughly in an attempt to fill all the pores in the microspheroidal siilca gel, which had a surface area of about 350 meters per gram. The silica mixture was added to an aqueous paste of the remaining ingredients, mixed by stirring for about a half hour, then dried, baked, crushed and sized.

To fill the reactor to a 12 inch settled height required 177 grams.

Data obtained in these runs are tabulated below.

TABLE XI

| $O_2/C_3H_6$ | $H_2O/C_3H_6$ | C.T., Sec. | T., ° C. | Mol Percent $C_3H_6$ Converted | Mol Percent Yield on Converted $C_3H_6$ | | Mol Percent Efficiency | |
|---|---|---|---|---|---|---|---|---|
| | | | | | Acr. | AA | Acr. | AA |
| 2.68 | 9.98 | 8.8 | 350 | 80.0 | 32.8 | 44.9 | 26.2 | 35.9 |
| 2.62 | 3.62 | 8.6 | 375 | 88.3 | 20.5 | 43.7 | 18.1 | 28.6 |

If microspheroidal silica is used alone as a support, the catalyst should be prepared by precipitating the $CoMoO_4$ onto the siilca particles to fill as much of the surface as possible. The tellurium compound and the rhenium compound can be added to the occluded silica before drying and baking.

For comparative purposes the components of the catalyst of this invention were tested for their ability to convert propylene to acrylic acid and acrolein.

$TeO_2$ alone shows practically no activity below 400° C. At 420° C. only 11% of the propylene fed, using an excess of 66% oxygen and 20 second contact time, was converted, about 90% of the product converted was acrolein.

$CoMoO_4$ alone showed a conversion of 68.1%, at 370° C. with an excess of 66% oxygen and a 28 second contact time, but the yield of acrolein was only 3.4% and that of acrylic acid 3.5%. Considerable amounts of acetic acid are also produced.

It requires the unique combination of cobalt molybdate, plus the amount of a tellurium compound in the range indicated herein and the amount of a rhenium compound in the range indicated to provide a superior catalyst for producing the products desired from propylene and oxygen.

We claim:
1. A composition comprising on a molar ratio 800 $CoMoO_4$, 15–300 $TeO_2$ and 1–10 of $HReO_4$.
2. A composition comprising on a molar ratio 800 $CoMoO_4$, 15–30 $TeO_2$ and 1–2 $HReO_4$.
3. A composition comprising on a molar ratio of 800 $CoMoO_4$, 20 $TeO_2$ and 1 $HReO_4$.
4. A composition comprising on a molar ratio 800 $CoMoO_4$, 300 $TeO_2$ and 10 $HReO_4$.
5. The composition of claim 1 impregnated on a silicic support.
6. A composition comprising on a molar ratio 800 $CoMoO_4$, 15–300 $TeO_2$ and 1–10 of $Re_2O_7$.

References Cited
UNITED STATES PATENTS

| | | | |
|---|---|---|---|
| 3,369,049 | 2/1968 | Eden | 260—604 |
| 3,177,257 | 3/1965 | Detling | 260—604 |
| 3,301,906 | 1/1967 | Besozzi | 260—604 |
| 3,322,693 | 5/1967 | Bethell | 252—470 |

PATRICK P. GARVIN, *Primary Examiner.*

U.S. Cl. X.R.

260—533, 604

PO-1050
(5/69)

UNITED STATES PATENT OFFICE
CERTIFICATE OF CORRECTION

Patent No. 3,451,946　　　　　　　　Dated June 24, 1969

Inventor(s) Charles E Ziegler and Jamal S. Eden

It is certified that error appears in the above-identified patent and that said Letters Patent are hereby corrected as shown below:

Column 5, line 65, for "microsperoidal" read --microspheroidal--. Column 6, line 46, for " Table VIII" read --Table VII--; column 6, line 66, for "655" read --355--. Column 7, line 4, for "particles" read --particle--; column 7, line 6, for "apepar" read --appear--; column 7, line 65, after "air-" insert --steam--. Column 8, Table IX, under Mol Percent Efficiency AA, line 3, for "54.3" read --54.8--; column 8, Table IX, under Mol Percent Efficiency AA, line 4, for "47.8" read --47.3--; column 8, Table XI, under $H_2O/C_3H_6$, line 1, for "9.98" read --3.98--; column 8, Table XI, under Mol Percent Efficiency AA, line 2, for "28.6" read --38.6--.

SIGNED AND
SEALED

APR 7 1970

(SEAL)
Attest:

Edward M. Fletcher, Jr.
Attesting Officer

WILLIAM E. SCHUYLER, JR.
Commissioner of Patents